US009858826B2

(12) United States Patent
Brantley et al.

(10) Patent No.: US 9,858,826 B2
(45) **Date of Patent: *Jan. 2, 2018**

(54) WING PROTECTION SYSTEM

(71) Applicants: Jeffrey Lon Brantley, Guyton, GA (US); Anthony Scott Grafton, Rincon, GA (US); Edward Eric Mitchell, Hillsboro, OR (US)

(72) Inventors: Jeffrey Lon Brantley, Guyton, GA (US); Anthony Scott Grafton, Rincon, GA (US); Edward Eric Mitchell, Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,950

(22) Filed: May 1, 2017

(65) Prior Publication Data

US 2017/0337830 A1 Nov. 23, 2017

Related U.S. Application Data

(63) Continuation-in-part of application No. 15/156,662, filed on May 17, 2016, now Pat. No. 9,672,750.

(51) Int. Cl.

| | |
|---|---|
| ***G08G 5/04*** | (2006.01) |
| ***G08B 23/00*** | (2006.01) |
| ***B64C 3/00*** | (2006.01) |
| ***B27C 5/06*** | (2006.01) |
| ***B25B 5/00*** | (2006.01) |
| ***B64D 47/06*** | (2006.01) |

(52) U.S. Cl.

CPC ............... *G08G 5/04* (2013.01); *B64D 47/06* (2013.01)

(58) Field of Classification Search

CPC ...................................................... G08B 21/18

See application file for complete search history.

(56) References Cited

U.S. PATENT DOCUMENTS

| | | | | |
|---|---|---|---|---|
| 4,632,340 A * | 12/1986 | Duea | B64C 3/58 | 244/1 R |
| 5,740,791 A * | 4/1998 | Aves | A61B 1/32 | 128/200.26 |
| 2005/0222769 A1* | 10/2005 | Simon | G06F 7/00 | 701/300 |
| 2009/0216087 A1* | 8/2009 | Bjork | A61B 50/00 | 600/201 |
| 2010/0251453 A1* | 10/2010 | Chen | B60Q 1/2673 | 2/69 |
| 2014/0331458 A1* | 11/2014 | Ozawa | F16L 33/03 | 24/270 |

* cited by examiner

*Primary Examiner* — Joseph Feild
*Assistant Examiner* — Pameshanand Mahase

(57) ABSTRACT

A wing protection system for increasing avoidance of grounded aircraft utilizes a plurality of wing clamps attached to an aircraft wing. A wing clamp from the plurality of wing clamps houses an electronics assembly; the electronics assembly including a plurality of sensors, a processor, a transceiver, and a peripheral alert system. The plurality of sensors detects objects approaching the grounded aircraft, while the peripheral alert system provides a visual and audible alert to the presence of the grounded aircraft; the processor receiving signals from the plurality of sensors and dictating appropriate action of the peripheral alert system. The transceiver allows data to be shared with a compatible user device, wherein a software application run on the compatible user device provides a digital representation of the plurality of wing clamps positioned about the aircraft.

10 Claims, 13 Drawing Sheets

2
20
43
40
40
40
21
4

WING PROTECTION SYSTEM

The current application is a continuation in part of U.S. Utility patent application Ser. No. 15/156,662 filed on May 17, 2016.

FIELD OF THE INVENTION

The present invention relates generally to aircraft avoidance. More specifically, the present invention is a wing protection system to deter vehicles from hitting an aircraft parked on a runway or in a hanger.

BACKGROUND OF THE INVENTION

Many aircraft collisions occur while an aircraft is grounded, and often times are not the fault of the aircraft, but rather are a result of personnel and vehicles running into the grounded aircraft. It is common for such collisions to involve the wings of the aircraft, as they have a smaller profile when observed straight on. Additionally, while the fuselage may be visible, it can be difficult to determine the extent to which the wings extend from the fuselage. When there is little to no light, the visibility of the aircraft wings is decreased even further, leading to a higher risk of collision with incoming objects. Even minor collision incidents can lead to costly repairs and can temporarily ground the aircraft until repairs can be made, which in the case of airline companies can lead to further costs due to flight cancellations. Thus, a collision avoidance system to deter and warn incoming objects of the presence of an aircraft in order to reduce grounded collisions is needed. Furthermore, the collision avoidance system should be readily attached and detached from the wing of an aircraft, such that no additional weight is added to the aircraft in flight, and such that the aircraft flight preparation is not drastically increased.

Therefore, it is the object of the present invention to provide a wing protection system to warn ground vehicles and personnel of the presence of a grounded aircraft. The wing protection system is attached to the wingtip, and includes a plurality of wing clamps. Each of the plurality of wing clamps has a peripheral alert system that provides a visual and audible warning to deter incoming personnel and vehicles. A plurality of sensors of each wing clamp detects the distance of incoming objects, wherein the calculated distance of the object from the wingtip determines the specific alert. As the object approaches the wingtip, a warning light changes colors according to the proximity, while an audible alarm can provide a constant or variable alert. Each of the wing clamps rests on top of the wing and is padded in order to prevent damage to the wing. Each wing clamp comprises an arm and a clamp; the arm being positioned on top of the wing and the clamp extending around the edge of the wing.

DETAIL DESCRIPTIONS OF THE INVENTION

All illustrations of the drawings are for the purpose of describing selected versions of the present invention and are not intended to limit the scope of the present invention.

The present invention is a wing protection system to warn ground vehicles and personnel of the presence of a grounded aircraft. The present invention is positioned onto the wing of the grounded aircraft and provides visual and audible warnings as nearby objects are detected. In the preferred embodiment, the present invention includes a plurality of wing clamps, wherein each of the plurality of wing clamps is uniquely positioned about the aircraft.

Figure 3:
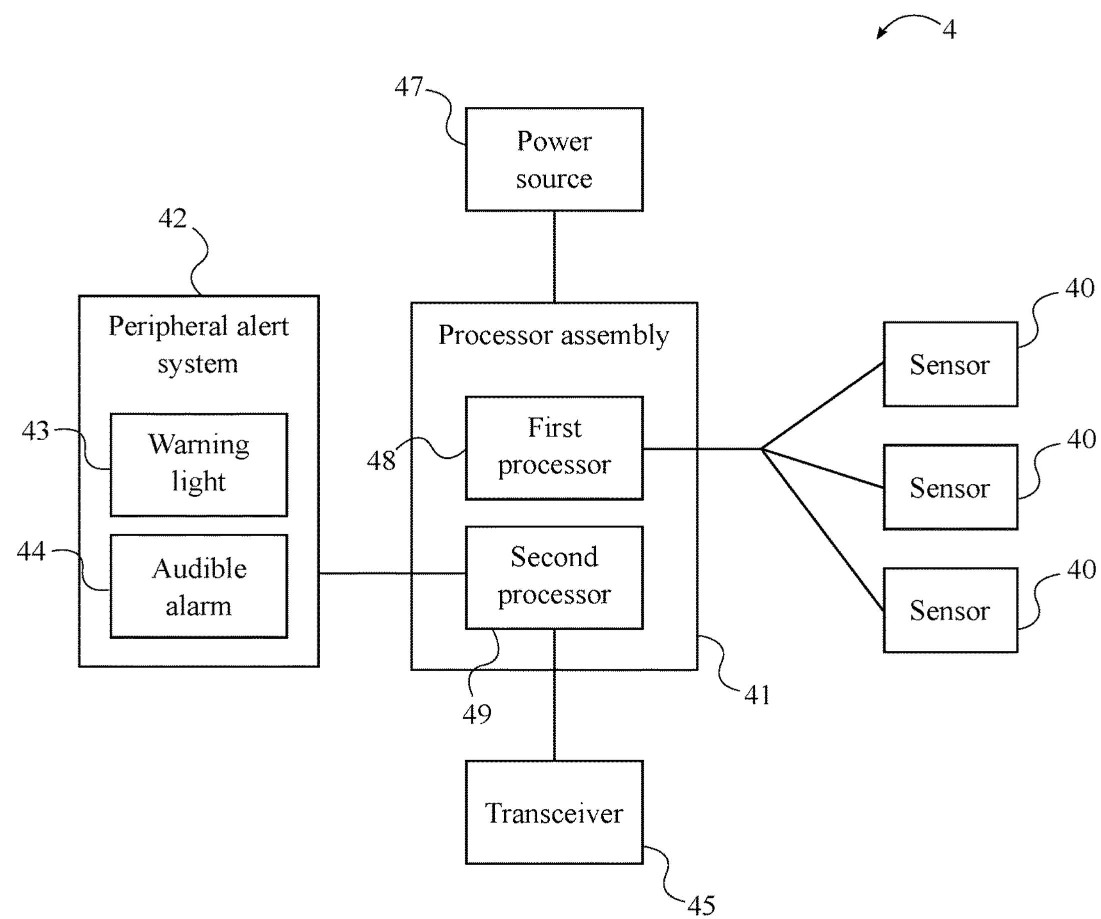
FIG. 3 is a diagram depicting the electronic connections between the processor assembly and the plurality of sensors, the peripheral alert system, the transceiver, and the power source for a wing clamp.

In reference to FIG. 3, a wing clamp, from the plurality of wing clamps, is outfitted with an electronics assembly 4, wherein the electronics assembly includes a plurality of sensors 40, a processor assembly 41, a peripheral alert system 42, and a transceiver 45. The plurality of sensors 40, the peripheral alert system 42, and the transceiver 45 are electronically connected to the processor assembly 41. The transceiver 45 and the processor assembly 41 are positioned within the wing clamp, while the plurality of sensors 40 and the peripheral alert system 42 are exteriorly positioned about the wing clamp.

In further reference to FIG. 3, the plurality of sensors 40 is utilized to detect the approaching objects, while the peripheral alert system 42 is utilized to provide warning signals to the approaching objects and/or individual towing the aircraft. The processor assembly 41 is an intermediary to the plurality of sensors 40 and the peripheral alert system 42, wherein the processor assembly 41 receives signals from the plurality of sensors 40 and interprets the signals in order to determine the appropriate response signals to send to the peripheral alert system 42 in order to carry out the corresponding warning signal. Each of the plurality of sensors 40 is a distance measuring sensor that is used to constantly observe the area surrounding the wing. In the preferred embodiment of the present invention, each of the plurality of sensors uses sonar to detect the distance of an approaching object; however, different types of sensors may be utilized in other embodiments.

Figure 1:
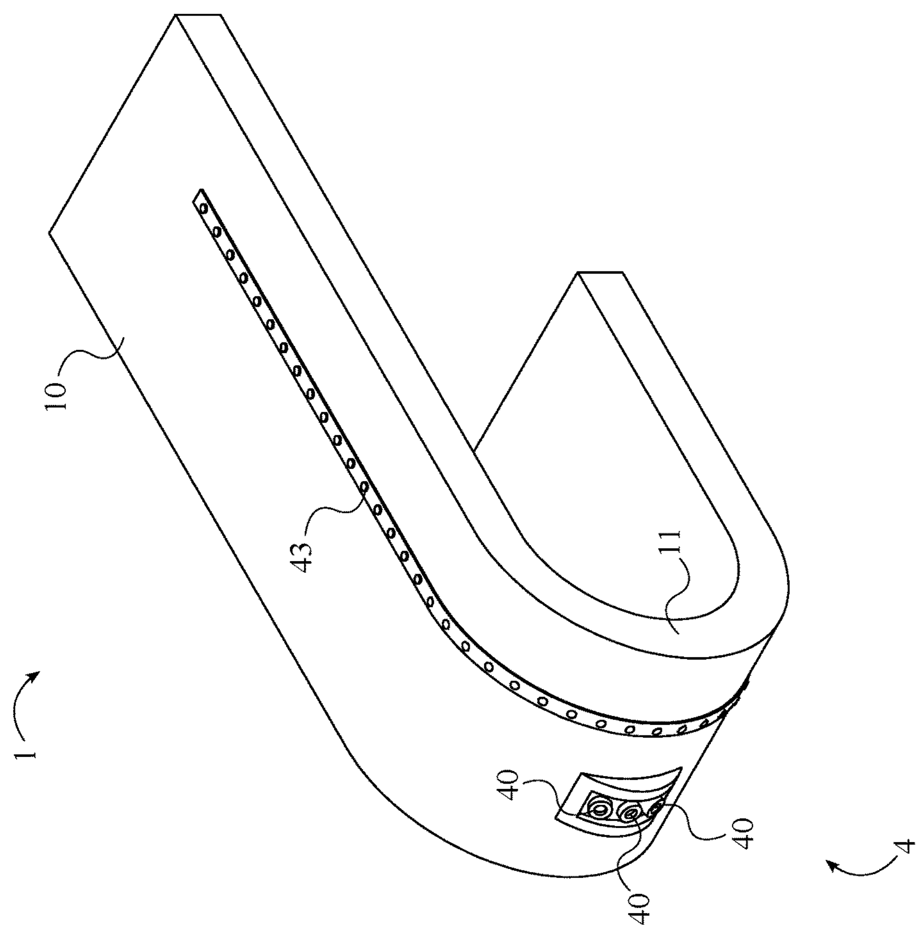
FIG. 1 is a perspective view of a first wing clamp being contoured to engage the leading edge of an aircraft wing.
Figure 2:
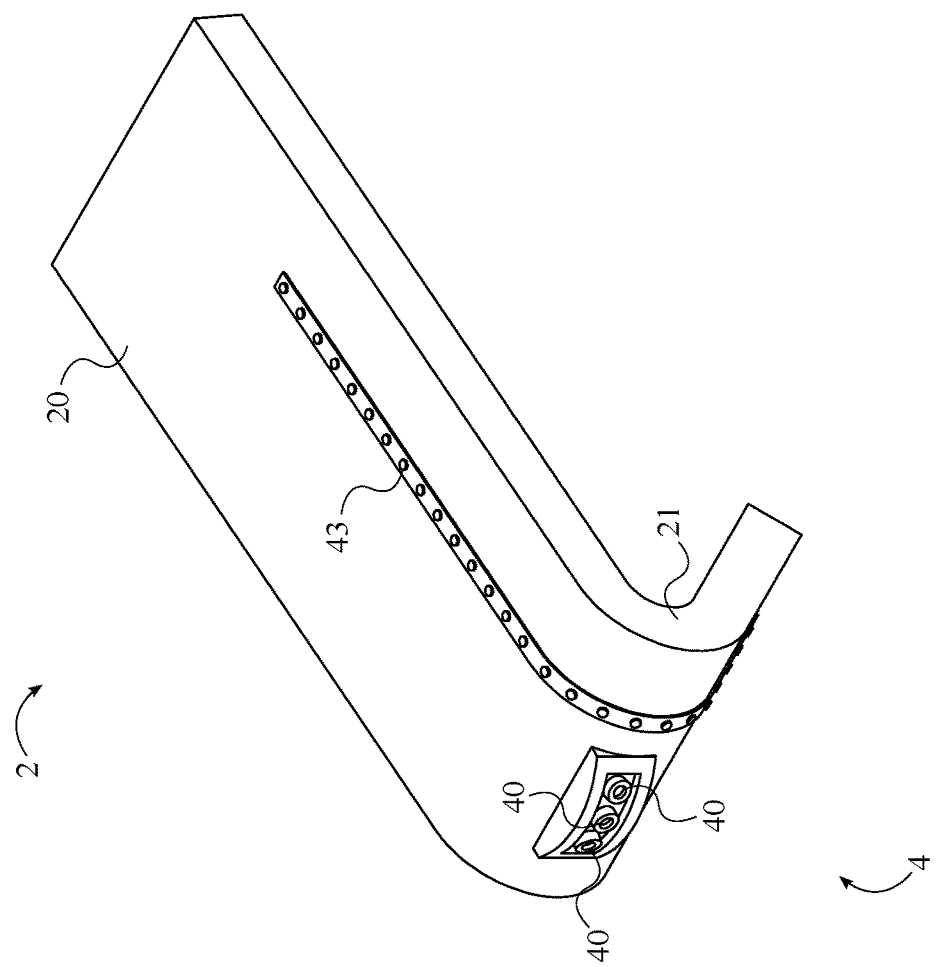
FIG. 2 is a perspective view of a second wing clamp being contoured to engage the trailing edge of an aircraft wing.

In reference to FIG. 1-2, the wing clamp comprises an arm and a clamp; the clamp being terminally connected to the arm. When the wing clamp is positioned about an aircraft wing, the arm is positioned on top of the aircraft wing and the wing clamp is positioned around a side or end of the aircraft wing. The plurality of sensors 40 is mounted into the clamp, such that the plurality of sensors 40 is directed away from the edge or end of the aircraft wing. This allows the plurality of sensors 40 to scan and observe the environment around the aircraft wing for approaching objects. Meanwhile, the peripheral alert system 42 is adjacently connected to the wing clamp, such that the peripheral alert system is positioned about the wing clamp opposite the aircraft wing, when the wing clamp is attached to the aircraft wing.

The clamp is contoured depending on the desired location about the aircraft wing. If the wing clamp is to be positioned about the leading edge of the aircraft wing, then the clamp is contoured to encompass the leading edge. Similarly, if the wing clamp is to be positioned about the trailing edge of the aircraft wing, then the clamp is contoured to encompass the trailing edge. If the wing clamp is to be positioned about the wing tip of the aircraft wing, then the clamp is contoured to encompass the wing tip. The contour of the clamp ensures the plurality of sensors 40 is properly oriented in order to accurately survey the surrounding environment. Additionally, the clamp provides a degree of protection to the area of the aircraft wing to which the wing clamp is attached.

In addition to the contour of the clamp, the orientation of the plurality of sensors 40 depends on the location of the wing clamp about the aircraft wing. In reference to FIG. 1, if the wing clamp is intended to be positioned about the leading edge or the wing tip, then the plurality of sensors 40 is vertically aligned to allow a better high-to-low observation in front of and to the side of the aircraft. In reference to FIG. 2, if the wing clamp is intended to be positioned about the trailing edge, then the plurality of sensors 40 is aligned horizontally to allow a better side-to-side observation behind the aircraft.

In order to ensure the wing clamp remains in position about the aircraft wing, the arm may be weighted. It is also possible for magnets, friction pads, or other means of attachment to be utilized to secure the wing clamp to the aircraft wing. In the preferred embodiment, the wing clamp is padded in order to prevent any damage to the aircraft wing from the placement of the wing clamp onto the aircraft wing.

The peripheral alert system 42 is used to warn approaching vehicles, personnel, etc. of the presence of the grounded aircraft in order to prevent a collision, or to warn an individual operating an aircraft tow vehicle 98 of an approaching object. The processor assembly 41 receives signals from the plurality of sensors 40 and analyzes the incoming data to determine the distance of the approaching objects. The processor assembly 41 then determines an appropriate warning level, and communicates the warning level with the peripheral alert system 42, wherein the peripheral alert system 42 emits a corresponding warning signal. The peripheral alert system 42 includes a warning light 43 for providing visual warnings and an audible alarm 44 for providing audible warnings.

In the preferred embodiment of the present invention, the warning light 43 is a light strip that is positioned along the wing arm and the clamp, such that the warning light 43 wraps around the edge of the aircraft wing. Preferably, the warning light 43 constructed of light emitting diodes in the light strip configuration. However, it is possible for other light sources to be utilized, and for the warning light 43 to be configured in other variations, so long as visible light is produced and readily apparent when an approaching object is detected.

In the preferred embodiment of the present invention, the warning light 43 is capable of emitting three different colors of light. Each of the three colors corresponds to a different object range; a first color for a first object range, a second color for a second object range, and a third color for a third object range. The first object range is the outermost radial area around the plurality of sensors 40, within which approaching objects are warned. When an object is within the first object range, the first color is displayed. The second object range is an intermediary radial area between the first object range and the third object range. When an object is within the second object range, the second color is displayed. Finally, the third object range is the innermost radial area around the plurality of sensors 40. When an object is within the third object range, the third color is displayed.

In the preferred embodiment of the present invention, the first color is green, the second color is yellow, and the third color is red. The warning light 43 is configured to flash, or pulse, the first color, the second color, and the third color rather than provide constant illumination. As an approaching object enters and passes through the first object range, the warning light 43 flashes green; as the approaching object enters and passes through the second object range, the warning light 43 flashes yellow; as the approaching object enters and passes through the third object range, the warning light 43 flashes red. In other embodiments of the present invention, it is possible for the first color, the second color, and the third color to be different colors, and is possible for the warning light 43 to be steady. Additionally, the exact distance for each of the first object range, the second object range, and the third object range may vary between embodiments.

The audible alarm 44 is operated in conjunction with the warning light 43, wherein the audible alarm 44 produces a warning sound to alert approaching personnel of the presence of the grounded aircraft. The audible alarm 44 can be a horn, speaker, or any other device capable of producing an audible alert at an acceptable decibel level. The audible alarm 44 may emit a constant or intermittent sound. If the audible alarm 44 is configured to be intermittent, then the audible alarm 44 can be synched with the warning light 43 of the leading edge assembly, such that the audible alarm 44 emits sounds as the warning light 43 emits light, or such that the audible alarm 44 emits sound in between the flashes of light emitted from the warning light 43.

In reference to FIG. 3, in the preferred embodiment of the present invention, the processor assembly 41 comprises a first processor 48 and a second processor 49. The first processor 48 is electronically connected in between the plurality of sensors and the second processor 49, while the second processor 49 is also electronically connected to the peripheral alert system 42 and the transceiver 45. The first processor 48 receives signals from the plurality of sensors 40 and calculates the distance of an incoming object. The information calculated from the plurality of sensors 40 is then sent to the second processor 49, wherein the second processor 49 actuates the peripheral alert system 42 in a manner corresponding to the distance of the incoming object. Additionally, the second processor 49 sends the calculated data from the first processor 48 to a compatible user device 96 through the transceiver.

Figure 4:
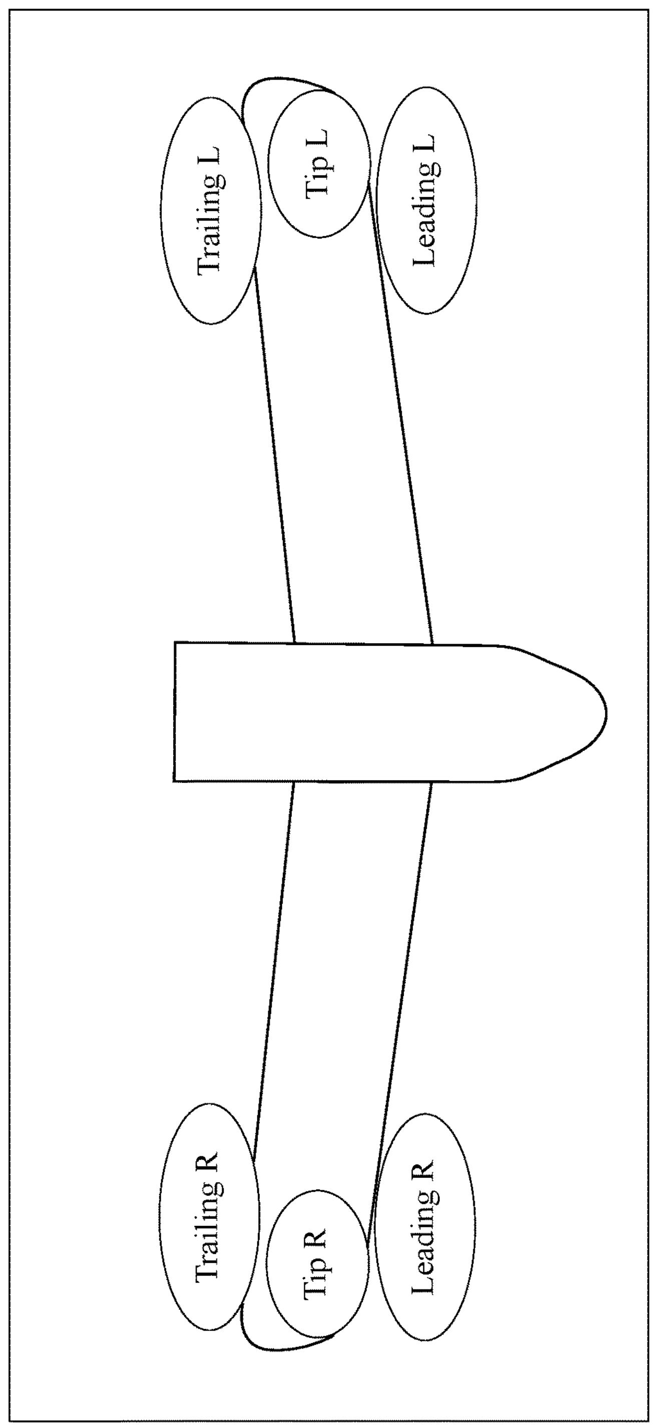
FIG. 4 is a diagram depicting an interface of the software application used to show a digital representation of the aircraft wings and the location of each of the plurality of wing clamps.

The transceiver 45 is synchronized with the compatible user device 96, wherein the processor assembly 41 is communicably coupled to the compatible user device 96 through the transceiver 45. A software application is run on the compatible user device 96, wherein the software application allows a user to view the actuation of the peripheral alert system 42 on a screen, in the form of a diagram, as depicted in FIG. 4. In the preferred embodiment of the present invention, the compatible user device 96 is a tablet that is mounted to an aircraft tow vehicle 98; in this way, the compatible user device 96 provides the operator of the aircraft tow vehicle 98 with a secondary means of alert. The secondary means of alert is important, as the operator of the aircraft tow vehicle 98 may have an obstructed view of the wing clamp from the fuselage or other parts of the aircraft. When the warning light 43 is actuated, the software application displays the corresponding warning signal on the compatible user device 96. For example, if the warning light 43 is flashing green, then the software application will indicate the location of the wing clamp in green on the digital representation of the aircraft wing.

Figure 5:
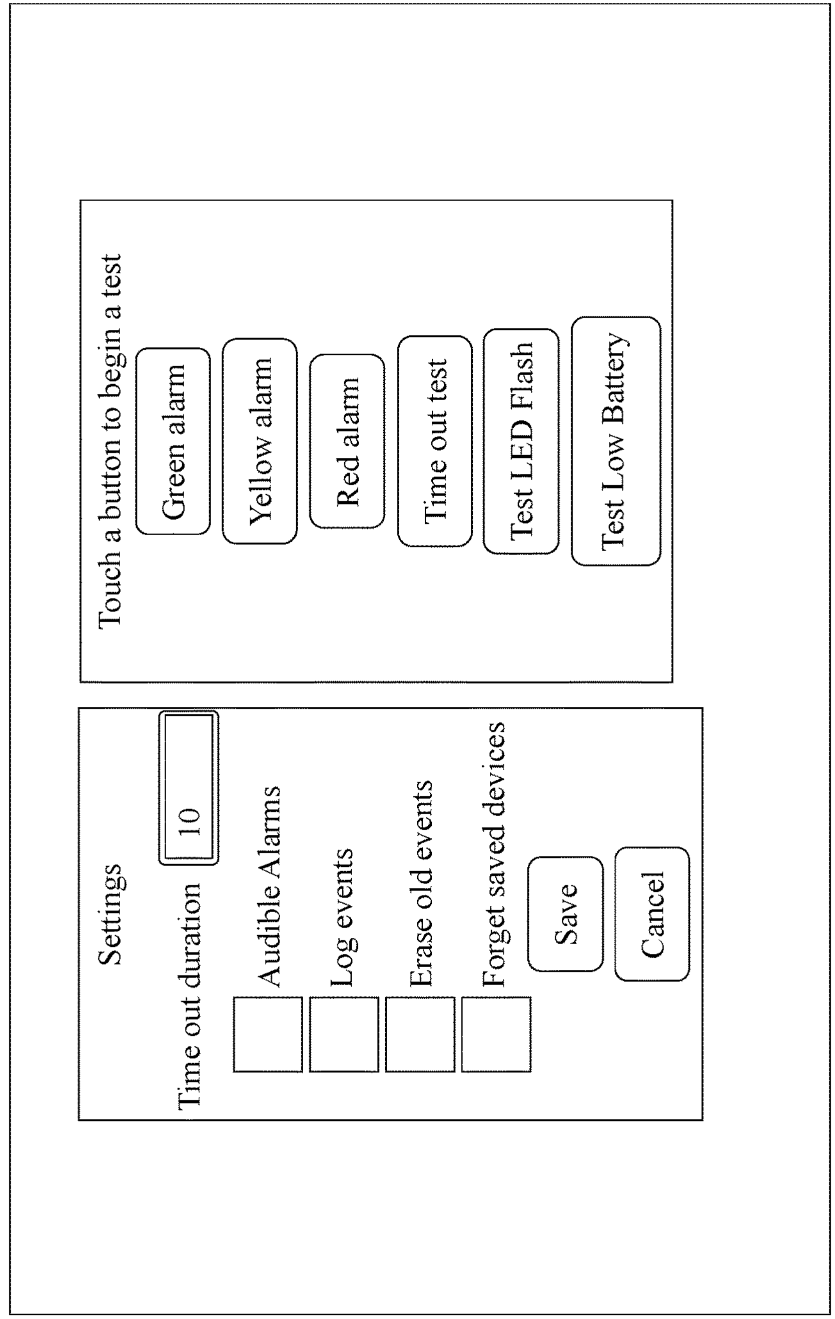
FIG. 5 is a diagram depicting a settings and operational test page of the software application.

In addition to displaying the corresponding warning signal of the warning light 43, the software application allows the user to manage settings for the wing clamp and perform operational tests for the wing clamp. For example, the software application can be used to enable or disable audible alarms, enable or disable the logging of events, erase stored events, save connected devices, forget saved devices, etc., as depicted in FIG. 5. Additionally, the software application can be utilized to adjust the values for the first object range, the second object range, and the third object range. The operational tests allow the user to check each warning light color, test the flash ability of the warning light 43, and check for a low battery. In the preferred embodiment, the software application displays a selection for each of the colors of the warning light 43; green, yellow, and red. When the user selects one of the colors, the warning light 43 illuminates in the corresponding color to show that peripheral alert system 42 is functioning properly.

The wing clamp, being a first wing clamp 1, is used in conjunction with at least one subsequent wing clamp to surveil the area around the aircraft wing. In the preferred embodiment of the present invention, the at least one subsequent wing clamp is a second wing clamp 2. The first wing clamp 1 and the second wing clamp 2 are positioned about the wingtip and opposite each other across the aircraft wing; the first wing clamp 1 and the second wing clamp 2 being padded in order to prevent damage to the aircraft wing. The first wing clamp 1 is shaped to be fitted around the leading edge of the aircraft wing, as depicted in FIG. 1, while the second wing clamp 2 is shaped to be fitted around the trailing edge of the aircraft wing, as depicted in FIG. 2. A first arm 10 of the first wing clamp 1 is positioned on top of the aircraft wing, while a first clamp 11 of the first wing clamp 1 wraps around the leading edge of the aircraft wing. Similarly, a second arm 20 of the second wing clamp 2 is positioned on top of the aircraft wing, while a second clamp 21 of the second wing clamp 2 wraps around the trailing edge of the aircraft wing.

Each of the first wing clamp 1 and the second wing clamp 2 is outfitted with an electronics assembly 4; the electronics assembly 4 of the first wing clamp 1 being a leading edge assembly and the electronics assembly 4 of the second wing clamp 2 being a trailing edge assembly. The plurality of sensors 40 of the leading edge assembly is utilized to detect approaching objects in front of the aircraft, while the plurality of sensors 40 of the trailing edge assembly is utilized to detect approaching objects behind the aircraft. In the preferred embodiment of the present invention, the plurality of sensors 40 of both the leading edge assembly and the trailing edge assembly is specifically three sensors. Further, the plurality of sensors 40 of the leading edge assembly is vertically aligned, while the plurality of sensors 40 of the trailing edge assembly is horizontally aligned.

The peripheral alert system 42 of the leading edge assembly is used to warn either the operator of the aircraft tow vehicle 98 of objects in front of the aircraft, or warn vehicles, personnel, etc. that are approaching the aircraft head-on, of the presence of the grounded aircraft in order to prevent a collision. The processor assembly 41 of the leading edge assembly receives signals from the plurality of sensors 40 of the leading edge assembly and analyzes the incoming data to determine the distance of the approaching objects. The processor assembly 41 of the leading edge assembly then determines an appropriate warning level, and communicates the warning level with the peripheral alert system 42 of the leading edge assembly, wherein the peripheral alert system 42 of the leading edge assembly emits a corresponding warning signal.

Similarly, the peripheral alert system 42 of the trailing edge assembly is used to warn either the operator of the aircraft tow vehicle 98 of objects behind the aircraft, or warn vehicles, personnel, etc. that are approaching the aircraft from behind, of the presence of the grounded aircraft in order to prevent a collision. The processor assembly 41 of the trailing edge assembly receives signals from the plurality of sensors 40 of the trailing edge assembly and analyzes the incoming data to determine the distance of the approaching objects. The processor assembly 41 of the trailing edge assembly then determines an appropriate warning level, and communicates the warning level with the peripheral alert system 42 of the trailing edge assembly, wherein the peripheral alert system 42 of the trailing edge assembly emits a corresponding warning signal.

In other embodiments, a third wing clamp may be utilized in addition to the first wing clamp 1 and the second wing clamp 2. The third wing clamp is positioned about the wingtip, in between the first wing clamp 1 and the second wing clamp 2; the third wing clamp being padded in order to prevent damage to the aircraft wing. The third wing clamp is shaped to be fitted around the wing tip; the third wing clamp having a third arm that is positioned on top of the aircraft wing, and a third clamp that wraps around the wing tip. The third wing clamp is outfitted with an electronics assembly 4; the electronics assembly 4 of the third wing clamp being a wing tip assembly. The plurality of sensors 40 of the wing tip assembly is utilized to detect the approaching objects to the side of the aircraft. Preferably, the plurality of sensors 40 of the wing tip assembly is specifically three sensors. Further, the plurality of sensors 40 of the wing tip assembly is vertically aligned.

The peripheral alert system 42 of the wing tip assembly is used to warn either the operator of the aircraft tow vehicle 98 of objects to the side of the aircraft, or warn approaching vehicles, personnel, etc. that are approaching the aircraft from the side, of the presence of the grounded aircraft in order to prevent a collision. The processor assembly 41 of the wing tip assembly receives signals from the plurality of sensors 40 of the wing tip assembly and analyzes the incoming data to determine the distance of the approaching objects. The processor assembly 41 of the wing tip assembly then determines an appropriate warning level, and communicates the warning level with the peripheral alert system 42 of the wing tip assembly, wherein the peripheral alert system 42 of the leading edge assembly emits a corresponding warning signal.

In order to power the electronics assembly 4 of each of the plurality of wing clamps, a power source 47 is provided for each of the plurality of wing clamps, wherein the power source 47 is positioned within the wing clamp. The power source 47 is electrically connected to the electronics assembly 4, wherein the power source 47 provides electrical current that powers the electronics assembly 4. If the power source 47 is a rechargeable battery, then a charging port is integrated into the wing clamp in order to recharge the power source 47. If the power source 47 in a non-rechargeable battery, then an access panel is integrated into the wing clamp in order to remove and replace the power source 47.

The software application is particularly useful in managing the plurality of wing clamps, as synchronized wing clamps and the corresponding settings can be stored on the compatible user device 96. Furthermore, the software application provides the operator of the aircraft tow vehicle 98 with a precise indication of which peripheral alert system has been activated. When using the plurality of wing clamps, it may be difficult for the operator to differentiate which of the warning lights or audible alarms is being actuated, due to various obstructions. The software application allows the operator easily view the actuation of each of the wing clamps and the corresponding range of an incoming object.

In an alternative embodiment, the present invention further comprises a central support 3. In reference to FIG. 6, the central support 3 comprises a mounting plate 30 and a sensor housing 31; the first wing clamp 1, the second wing clamp 2, and the sensor housing 31 being adjacently connected to the mounting plate 30. The sensor housing 31 is positioned opposite the first wing clamp 1 and the second wing clamp 2 about the mounting plate 30, wherein the first wing clamp 1 and the second wing clamp 2 are positioned on the top of the mounting plate 30 and the sensor housing 31 is positioned on the bottom of the mounting plate 30. The sensor housing 31 extends downwards from the mounting plate 30 and is used to support components of the electronics assembly 4 that are used to detect objects approaching the wing and provide visual and audible warnings to the approaching objects.

In the alternative embodiment of the present invention, the wing is braced by the first wing clamp 1 and the second wing clamp 2, such that the central support 3 is positioned below the wing. Further, the central support 3 comprises a mounting plate 30 and a sensor housing 31; the first wing clamp 1, the second wing clamp 2, and the sensor housing 31 being adjacently connected to the mounting plate 30. The sensor housing 31 is positioned opposite the first wing clamp 1 and the second wing clamp 2 about the mounting plate 30, wherein the first wing clamp 1 and the second wing clamp 2 are positioned on the top of the mounting plate 30 and the sensor housing 31 is positioned on the bottom of the mounting plate 30. The sensor housing 31 extends downwards from the mounting plate 30 and is used to support components of the electronics assembly 4 that are used to detect objects approaching the wing and provide visual and audible warnings to the approaching objects.

Together, the first wing clamp 1 and the second wing clamp 2 are utilized to attach the present invention to the wing of the grounded aircraft, in the alternative embodiment. In reference to FIG. 6, the first wing clamp 1 is configured to conform to the profile of the leading edge of the wing, while the second wing clamp 2 is configured to conform to the profile of the trailing edge of the wing. The first wing clamp 1 and the second wing clamp 2 extend from the central support 3 in opposite directions, wherein the first wing clamp 1 engages with the leading edge of the wing and the second wing clamp 2 engages with the trailing edge of the wing. In the preferred embodiment of the present invention, the wing is braced by the first wing clamp 1 and the second wing clamp 2, such that the central support 3 is positioned above the wing.

Figure 6:
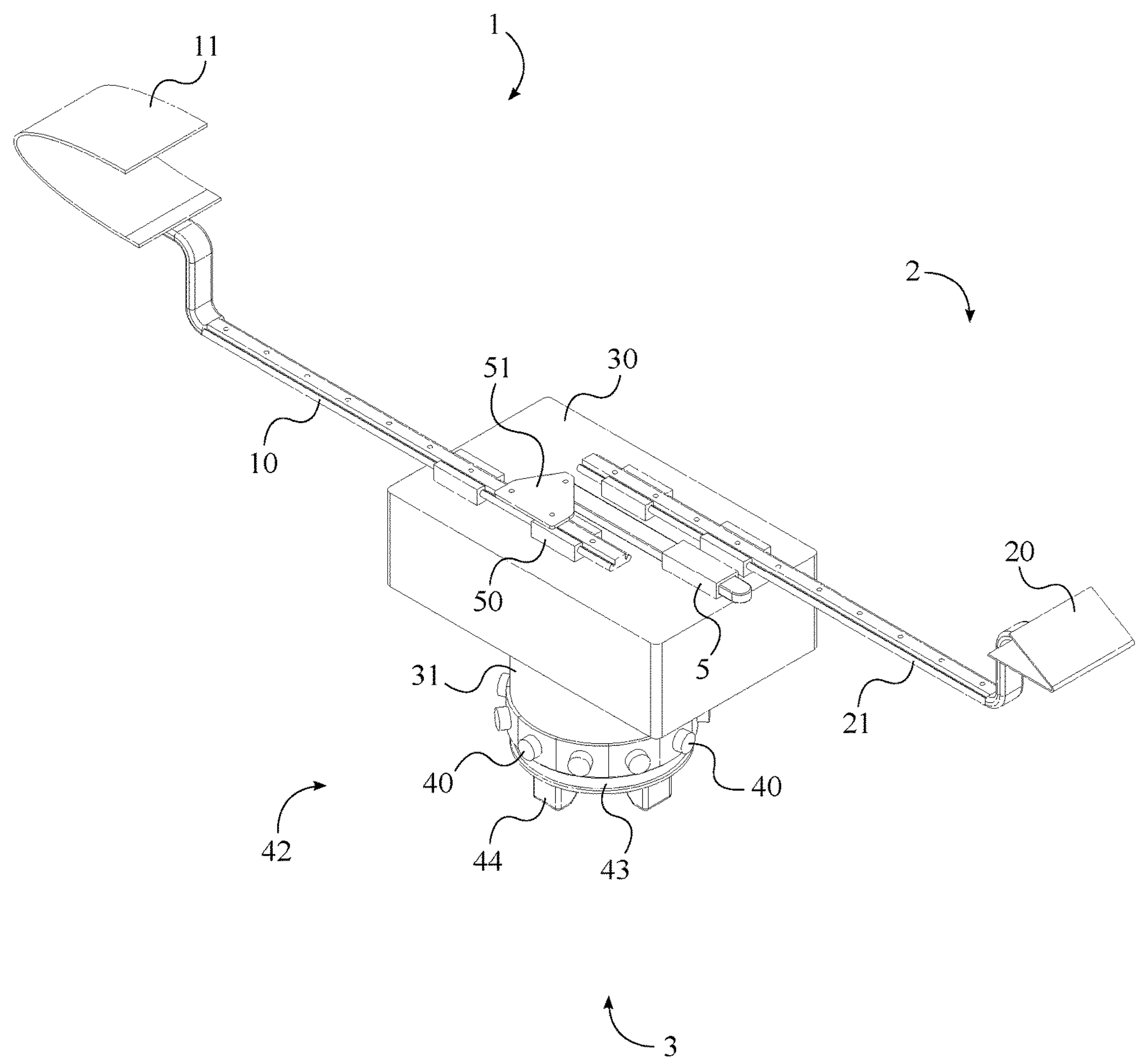
FIG. 6 is a perspective view of the present invention, wherein the first wing clamp is extended to be fitted around the wing of a grounded plane.

In the alternative embodiment of the present invention, the plurality of sensors 40 is positioned opposite the mounting plate 30, along the sensor housing 31, such that the plurality of sensors 40 is extended away from the wing. In the alternative embodiment of the present invention, the plurality of sensors 40 is specifically eleven sensors, wherein the plurality of sensors 40 is radially positioned around the sensor housing 31 providing 360 degrees of coverage, as depicted in FIG. 6. In another embodiment, the plurality of sensors 40 is specifically three sensors, wherein each of the plurality of sensors 40 is positioned at a 90-degree interval to provide 270 degrees of coverage. In reference to FIG. 6, the peripheral alert system 42 is positioned opposite the mounting plate 30 along the sensor housing 31, wherein the peripheral alert system 42 is positioned adjacent to the plurality of sensors 40. Alternatively, the peripheral alert system 42 can be positioned adjacent to the mounting plate 30.

In the alternative embodiment, the present invention is attached to the wing of the grounded aircraft via the first wing clamp 1 and the second wing clamp 2, wherein first wing clamp 1 and the second wing clamp 2 are positioned opposite each other across the mounting plate 30. More specifically, the present invention is attached to the wingtip. The first arm 10 and the second arm 20 are positioned along the mounting plate 30, wherein the first arm 10 and the second arm 20 are positioned parallel to each other. In the alternative embodiment of the present invention, the first arm 10 and the second arm 20 are connected to the top of the mounting plate 30, however, in other embodiments, the first arm 10 and the second arm 20 may be positioned into the mounting plate 30. A linear actuator 5 is utilized to extend and retract the first arm 10 in order to position the present invention around the wing of the grounded aircraft.

In further reference to FIG. 6, in the alternative embodiment, the first arm 10 is an elongated structure with a 90-degree bend, such that the first arm 10 extends away from the mounting plate 30 in two directions; out in front of the mounting plate 30 and up above the mounting plate 30. The first clamp 11 is terminally connected to the first arm 10 opposite the mounting plate 30, such that the first clamp 11 is positioned above and in front of the mounting plate 30. As such, the first clamp 11 is configured to receive the leading edge of the wing. Similar to the first arm 10, the second arm 20 is an elongated structure with a 90-degree bend, such that the second arm 20 extends away from the mounting plate 30 in two directions; out behind the mounting plate 30 and up above the mounting plate 30. The second clamp 21 is terminally connected to the second arm 20 opposite the mounting plate 30, such that the second clamp 21 is positioned above and behind the mounting plate 30. As such, the second clamp 21 is configured to receive the trailing edge of the wing.

Figure 7:
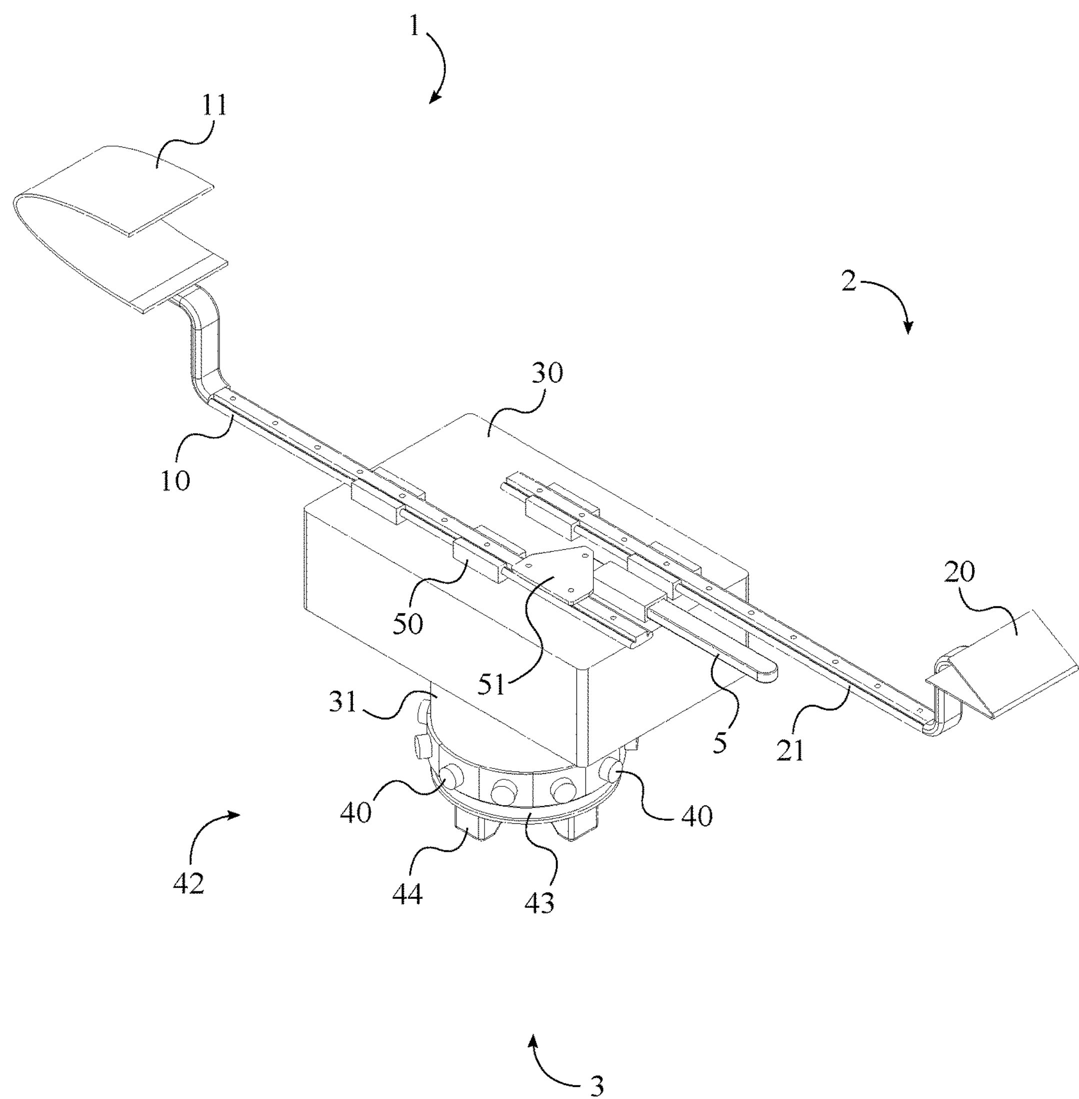
FIG. 7 is a perspective view of the present invention, wherein the first wing clamp is retracted to secure the present invention to the wing of the grounded plane.

In the alternative embodiment of the present invention, the linear actuator 5 only activates the first wing clamp 1, wherein the first wing clamp 1 is slidably coupled with the linear actuator 5; the linear actuator 5 being used to adjust the distance of the first clamp 11 from the leading edge of the wing by sliding the first arm 10, as depicted in FIG. 6-7. The first arm 10 is slidably positioned within a linear sleeve bearing 50 that retains the first arm 10 in a position parallel to the second arm 20. A coupler 51 is adjacently connected to the linear actuator 5 and the first arm 10, wherein the linear movement of the linear actuator 5 is translated to the first arm 10 through the coupler 51. As the linear actuator 5 is activated, the first arm 10 slides within the linear sleeve bearing 50, as depicted in FIG. 6-7, to either expand or contract the first clamp 11 in relation to the leading edge of the wing. In other embodiments of the present invention, other devices may be used to linearly move the first arm 10, such as a gear motor and tooth track integrated into either the first arm 10 or the second arm 20. Furthermore, it is also possible for the second wing clamp 2 to be actuated in addition to or in place of the first wing clamp 1.

Figure 8:
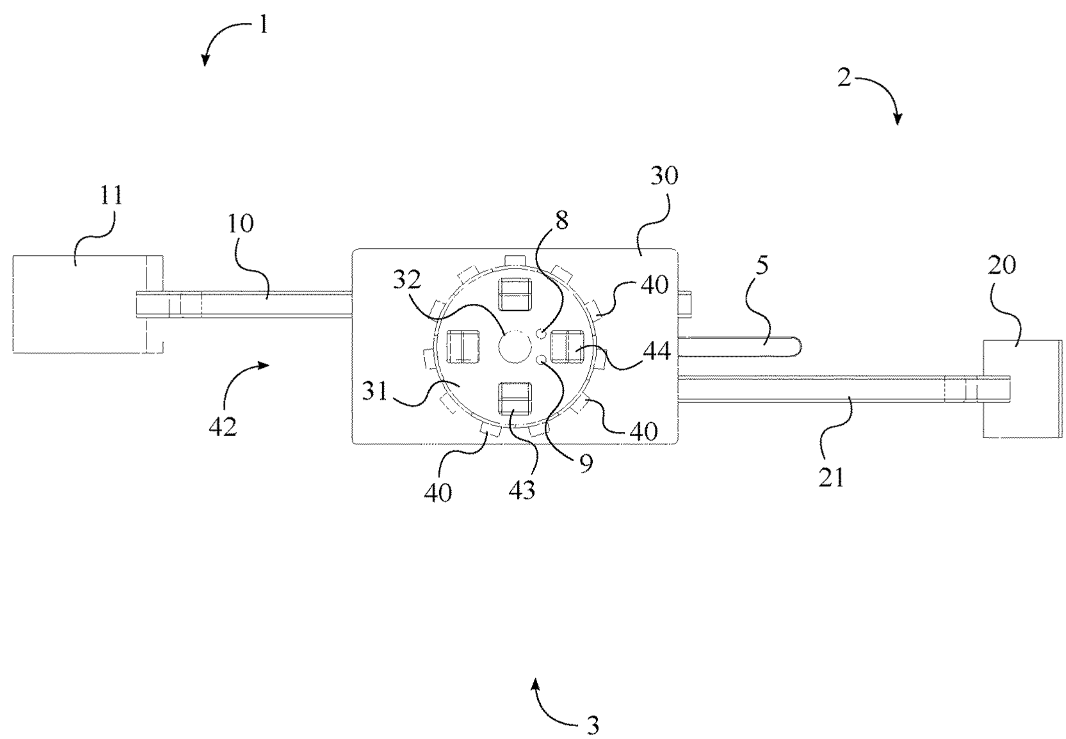
FIG. 8 is a bottom plan view of the present invention, detailing the positions of the adapter slot, the first actuator switch, and the second actuator switch.
Figure 9:
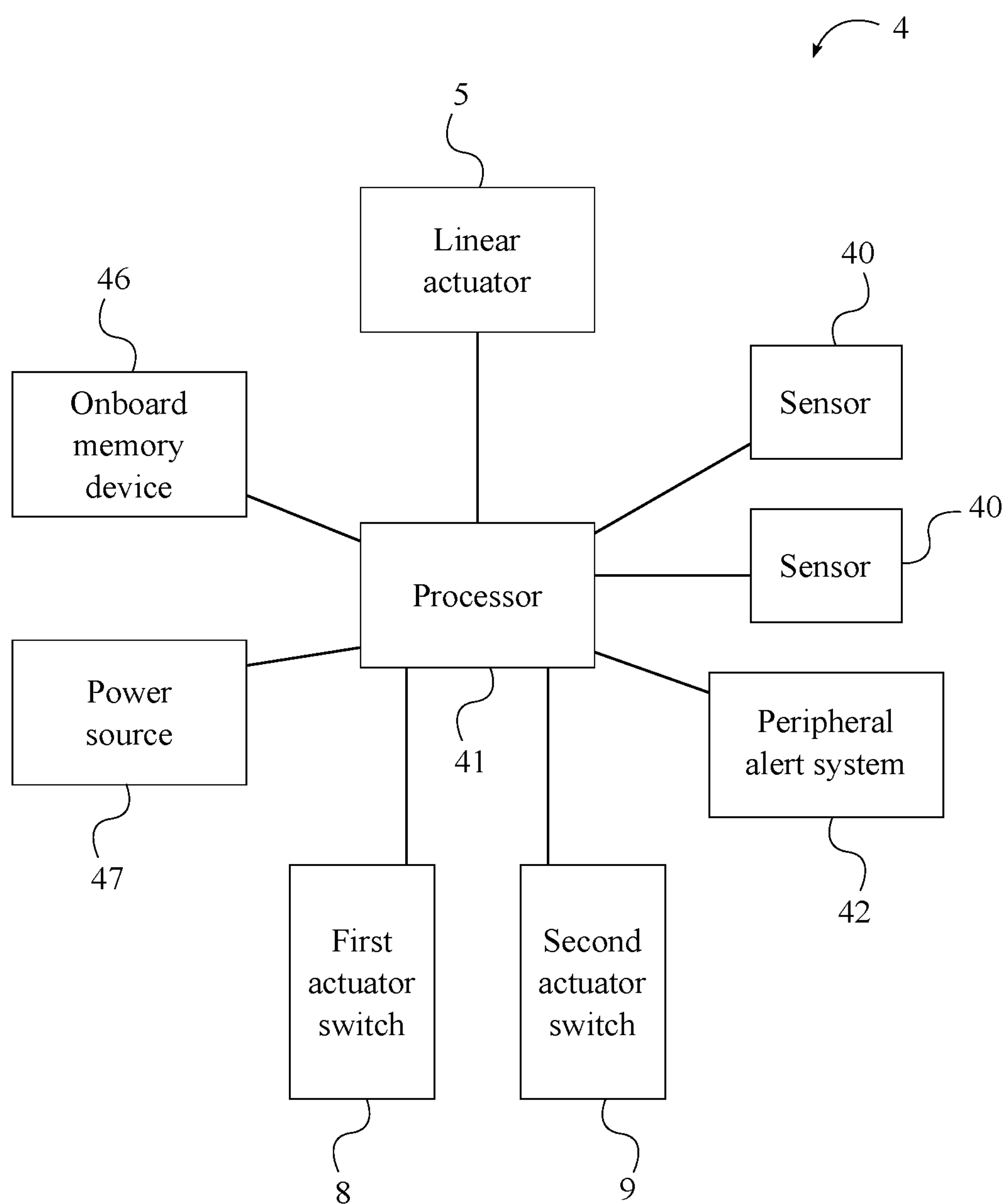
FIG. 9 is a diagram depicting the electronic connections between the processor and the first actuator switch, the second actuator switch, and the other components of the electronics assembly.

To install the present invention, the second clamp 21 is positioned around the trailing edge, wherein the wing is fit snuggly within the second clamp 21. The linear actuator 5 is then utilized to contract the first wing clamp 1 towards the second wing clamp 2, until the first clamp 11 engages the leading edge, wherein the wing is fit snuggly within the first clamp 11. In order to activate the linear actuator 5, the present invention further comprises a first actuator switch 8 and a second actuator switch 9 as depicted in FIG. 8. In reference to FIG. 9, the first actuator switch 8 and the second actuator switch 9 are electronically connected to the processor assembly 41, along with the linear actuator 5, wherein engagement of the first actuator switch 8 and the second actuator switch 9 instructs the processor assembly 41 to control the movement of the linear actuator 5. While the first actuator switch 8 and the second actuator switch 9 are used to control movement of the linear actuator 5 in opposite directions in the alternative embodiment, it is also possible for a single actuator switch to control movement of the linear actuator 5 in both directions.

The first actuator switch 8 is utilized to contract the first wing clamp 1 towards the second wing clamp 2, while the second actuator switch 9 is utilized to expand the first wing clamp 1 away from the second wing clamp 2. The first actuator switch 8 and the second actuator switch 9 can be any type of switch, such as a flip switch, push button, etc. Both the first actuator switch 8 and the second actuator switch 9 are mounted to the sensor housing 31 and positioned on the sensor housing 31 opposite the mounting plate 30 as depicted in FIG. 8, such that the first actuator switch 8 and the second actuator switch 9 are readily accessible to the user. When the first actuator switch 8 is engaged by the user, the processor assembly 41 controls the linear actuator 5 to contract the first wing clamp 1 towards the second wing clamp 2. Meanwhile, when the second actuator switch 9 is engaged by the user, the processor assembly 41 controls the linear actuator 5 to expand the first wing clamp 1 away from the second wing clamp 2.

Figure 10:
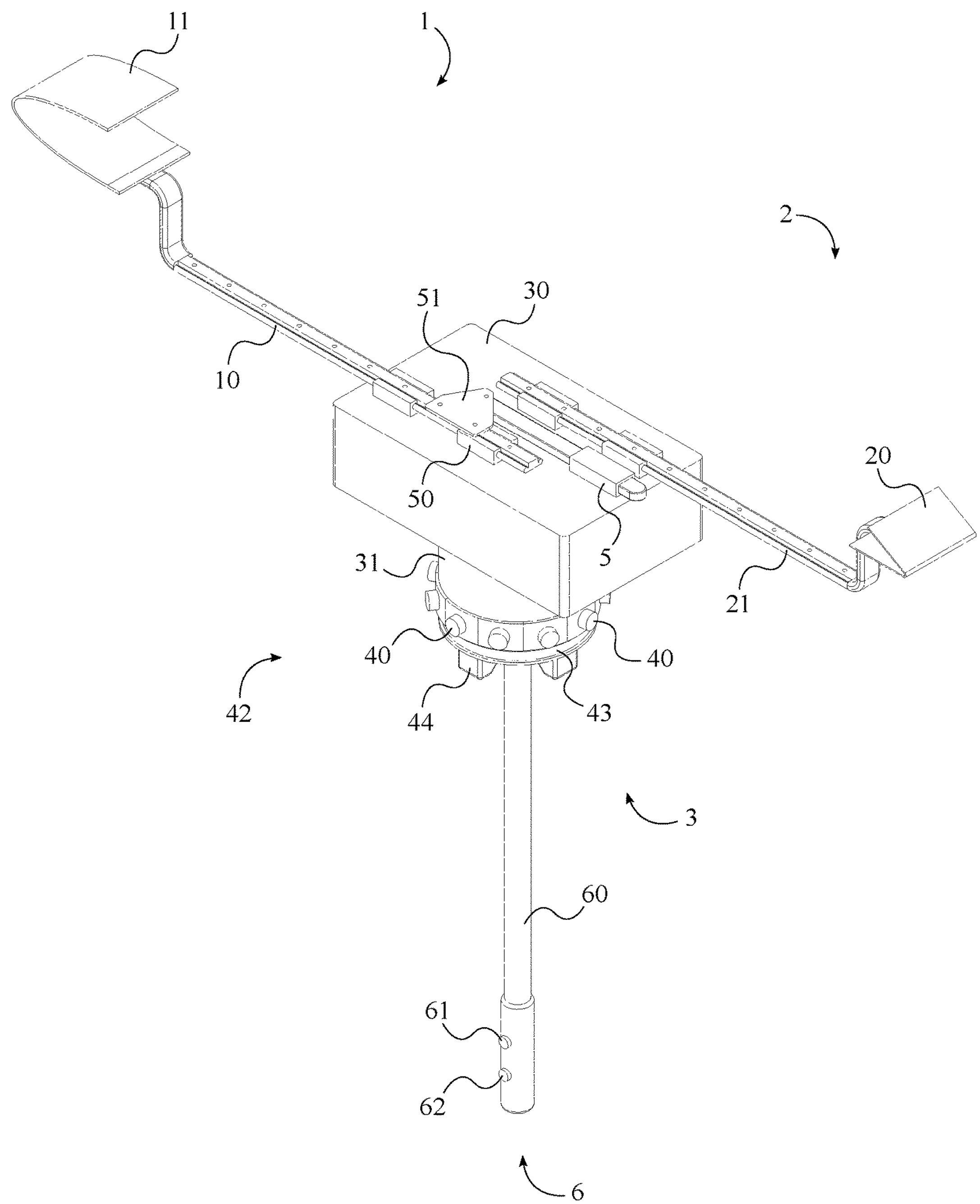
FIG. 10 is a perspective view of the present invention, wherein the activation handle is positioned into the adapter slot.
Figure 11:
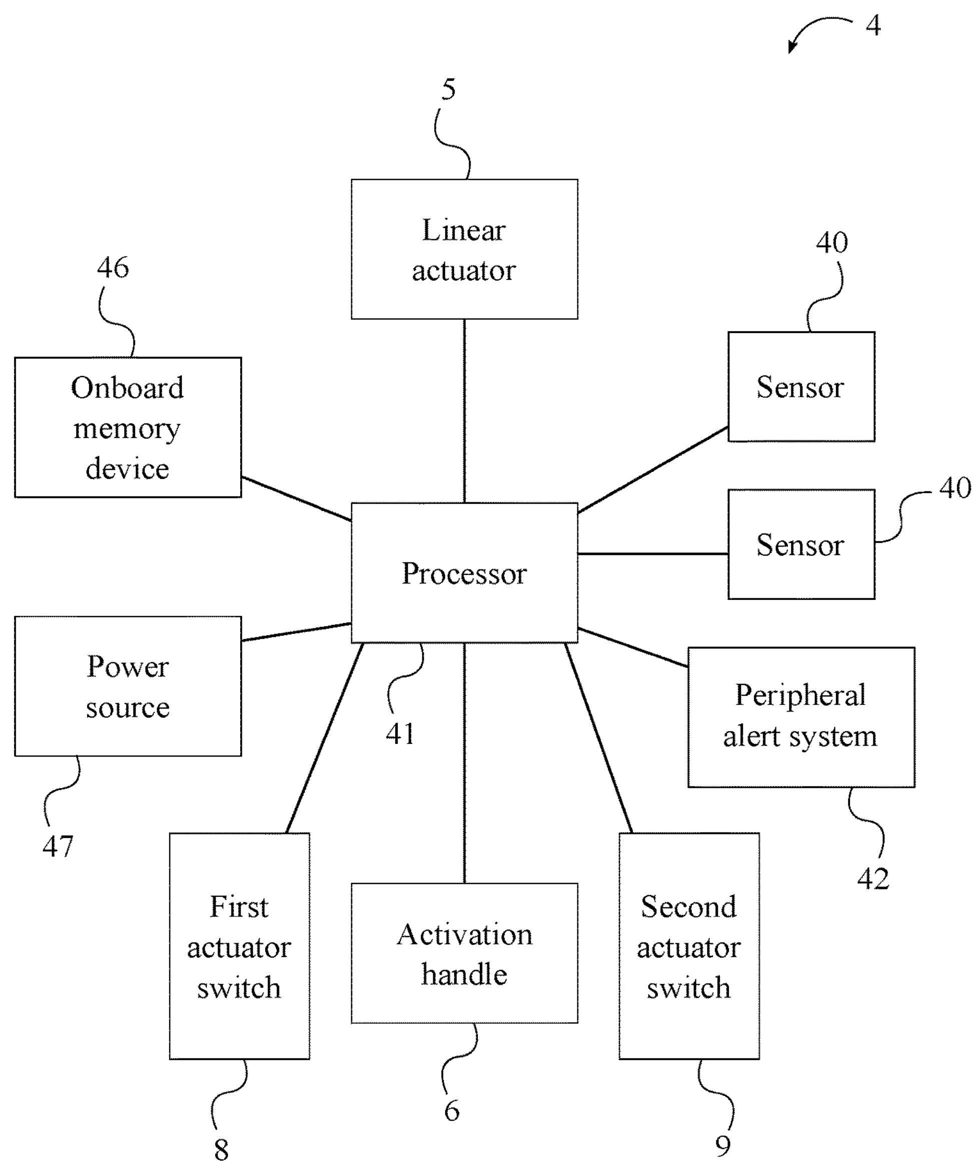
FIG. 11 is a diagram depicting the electronic connections between the processor and the activation handle, the first actuator switch, the second actuator switch, and the other components of the electronics assembly.

In reference to FIG. 10, in the alternative embodiment, the present invention may further comprise of an activation handle 6 that can be used in conjunction with or in place of the first actuator switch 8 and the second actuator switch 9. The activation handle 6 comprises a shaft 60, a first control 61, and a second control 62; the first control 61 and the second control 62 providing the same function as the first actuator switch 8 and the second actuator switch 9 respectively. The activation handle 6 provides an extension that allows the linear actuator 5 to be activated when the present invention is attached to higher aircraft wing, wherein the first actuator switch 8 and the second actuator switch 9 would be out of reach of the user. In such an embodiment, the sensor housing 31 further comprises an adapter slot 32, as depicted in FIG. 8, that is positioned on the bottom of the sensor housing 31, opposite the mounting plate 30. The activation handle 6 is positioned into the adapter slot 32, wherein the activation handle 6 is electronically connected to the processor assembly 41 as depicted in FIG. 11.

More specifically, the shaft 60 is positioned into the adapter slot 32, wherein the first control 61 and the second control 62 are electronically connected to the processor assembly 41. Similar to the first actuator switch 8 and the second actuator switch 9, engagement of the first control 61 and the second control 62 instructs the processor assembly 41 to control the movement of the linear actuator 5. The first control 61 and the second control 62 are integrated into the shaft 60 opposite the adapter slot 32, such that the first control 61 and the second control 62 are readily accessible to the user. When the first control 61 is engaged by the user, the processor assembly 41 controls the linear actuator 5 to contract the first wing clamp 1 towards the second wing clamp 2. Meanwhile, when the second control 62 is engaged by the user, the processor assembly 41 controls the linear actuator 5 to expand the first wing clamp 1 away from the second wing clamp 2.

Figure 12:
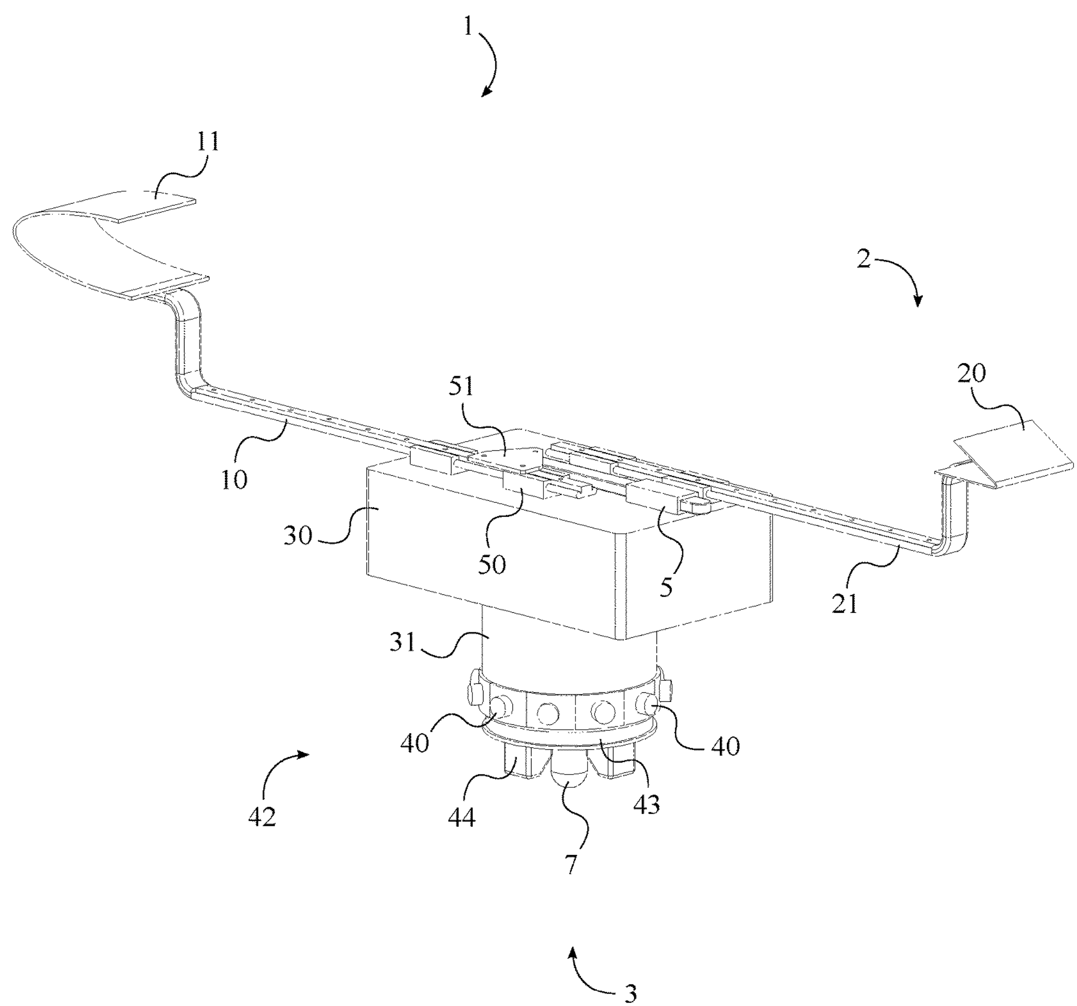
FIG. 12 is a perspective view of the present invention, wherein the surveillance camera is positioned into the adapter slot.
Figure 13:
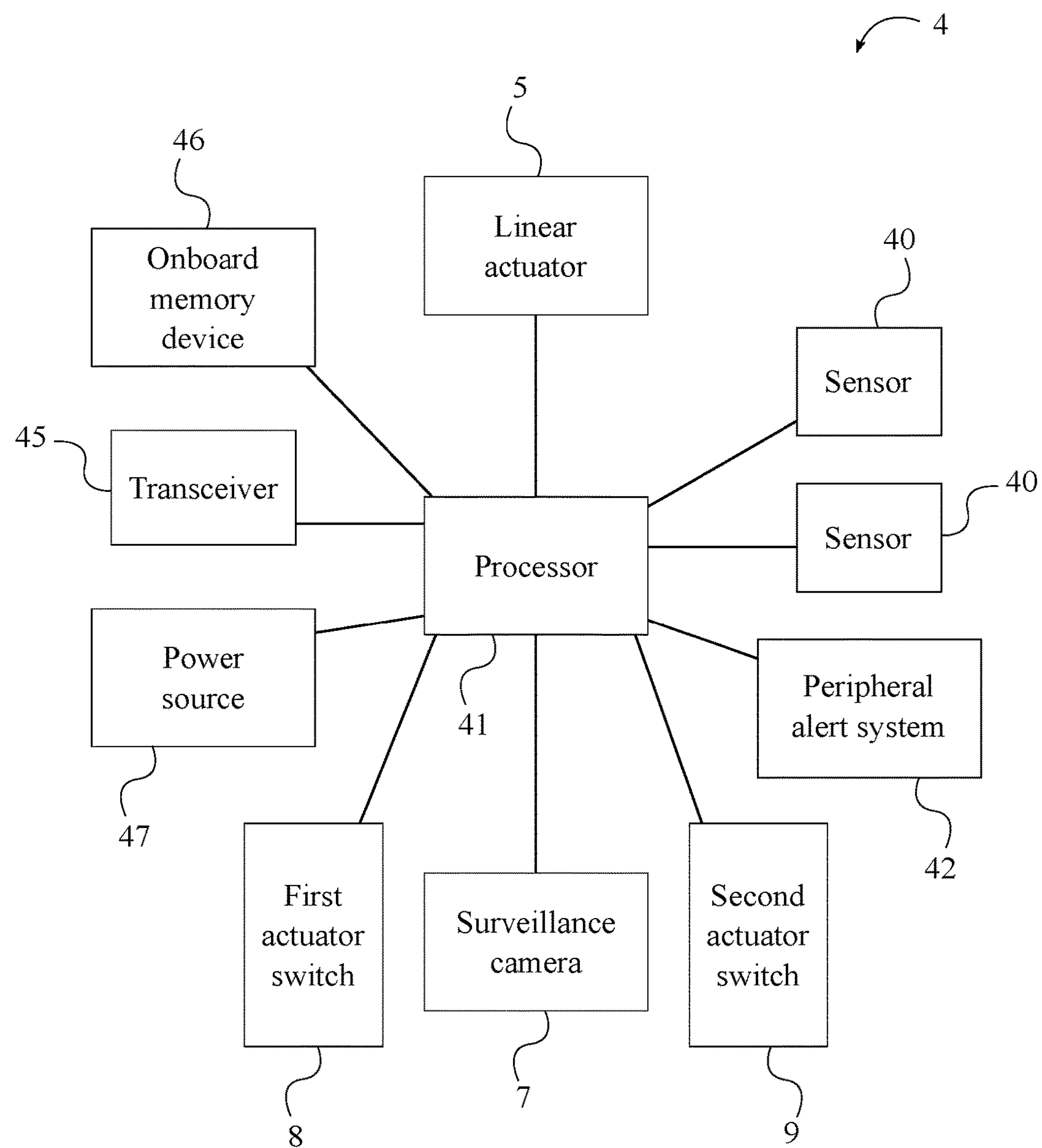
FIG. 13 is a diagram depicting the electronic connections between the processor and the surveillance camera, the first actuator switch, the second actuator switch, and the other components of the electronics assembly.

In reference to FIG. 12, the adapter slot 32 can also be used to retain a surveillance camera 7 when the activation handle 6 is removed. Similar to the activation handle 6, the surveillance camera 7 is positioned into the adapter slot 32, wherein the surveillance camera 7 is electronically connected to the processor assembly 41 as depicted in FIG. 13. The processor assembly 41 receives video surveillance data that is captured by the surveillance camera 7 and stores the video surveillance data on an onboard memory device 46, wherein the onboard memory device 46 is electronically connected to the processor assembly 41. In the alternative embodiment of the present invention, the surveillance camera 7 is a 360-degree camera, wherein the surveillance camera 7 is able to capture video surveillance data from every angle around the sensor housing 31. In other embodiments more than one camera may be utilized to obtain multiple viewing angles.

The surveillance camera 7 can be designed such that the surveillance camera 7 constantly records the surrounding environment of the grounded aircraft, or the processor assembly 41 can be programmed such that the surveillance camera 7 is turned on when an incoming object is detected by the plurality of sensors 40. Once the video surveillance data is captured by the surveillance camera 7 and recorded on the onboard memory device 46, the video surveillance data can be accessed by the user to review any accidents, security issues, etc. The transceiver 45 is synched with the compatible user device 96, wherein the processor assembly 41 dictates the transfer of the video surveillance data through the transceiver 45 to the compatible user device 96. The transceiver 45 can also be used to download alarm data from the peripheral alert system 42, wherein the alarm data can also be stored on the onboard memory device 46.

In some embodiments, the transceiver 45 can be used to channel live video streams to the compatible user device 96, wherein the user is able to monitor the grounded aircraft in real time. As the video surveillance data is captured by the surveillance camera 7, the processor assembly 41 immediately receives the video surveillance data and relays the video surveillance data to the transceiver 45. Additionally, the alarm data can be concurrently relayed in real time. It is also possible for the processor assembly 41 to direct the video surveillance data to the onboard memory device 46 and the transceiver 45 at the same time, wherein the video surveillance data is both stored on the onboard memory device 46 and available to be viewed through a live stream. Furthermore, in other embodiments of the present invention, the surveillance camera 7 may comprise an internal memory device that is used to store the video surveillance data directly on the surveillance camera 7. The surveillance camera 7 can then be detached in order to download the video surveillance data.

In order to power the electronics assembly 4 and the linear actuator 5, a power source 47 is provided, wherein the power source 47 is positioned within the central support 3. The power source 47 is electrically connected to the electronics assembly 4 and the linear actuator 5, wherein the power source 47 provides electrical current that powers the electronics assembly 4 and the linear actuator 5. Additionally, the power source 47 can be used to supply current to the surveillance camera 7 and the activation handle 6 when the surveillance camera 7 or the activation handle 6 are positioned within the adapter slot 32. If the power source 47 is a rechargeable battery, then a charging port is integrated into the central support 3 in order to recharge the power source 47. If the power source 47 in a non-rechargeable battery, then an access panel is integrated into the central support 3 in order to remove and replace the power source 47.

Although the invention has been explained in relation to its preferred embodiment, it is to be understood that many other possible modifications and variations can be made without departing from the spirit and scope of the invention as hereinafter claimed.

What is claimed is:

1. A wing protection system comprising:

a wing clamp;

an electronics assembly;

the wing clamp comprising an arm and a clamp;

the electronics assembly comprising a plurality of sensors, a processor assembly, a peripheral alert system and a transceiver;

the plurality of sensors, the peripheral alert system and the transceiver being electronically connected to the processor assembly;

the processor assembly and the transceiver being positioned within the wing clamp;

the clamp being terminally connected to the arm;

the plurality of sensors being mounted into the clamp;

the peripheral alert system being adjacently connected to the wing clamp;

the peripheral alert system comprising a warning light;

the warning light being a light strip positioned along the arm and the clamp;

the warning light selectively emitting a first light with a first color, a second light with a second color and a third light with a third color;

the first color, the second color and the third color being different from one another;

the first color corresponding to a first object range;

the second color corresponding to a second object range;

the third color corresponding to a third object range;

the second object range being located in between the first object range and the third object range;

the first object range being an outermost radial area around the plurality of sensors;

the second object range being an intermediary radial area around the plurality of sensors;

the third object range being an innermost radial area around the plurality of sensors;

the warning light emitting the first light with the first color in response to an object being located within the first object range;

the warning light emitting the second light with the second color in response to an object being located within the second object range; and the warning light emitting the third light with the third color in response to an object being located within the third object range.

2. The wing protection system as claimed in claim 1, wherein the plurality of sensors is vertically aligned.

3. The wing protection system as claimed in claim 1, wherein the plurality of sensors is horizontally aligned.

4. The wing protection system as claimed in claim 1, wherein the wing clamp is contoured to encompass a leading edge of an aircraft wing.

5. The wing protection system as claimed in claim 1, wherein the wing clamp is contoured to encompass a trailing edge of an aircraft wing.

6. The wing protection system as claimed in claim 1, wherein the wing clamp is contoured to encompass a wing tip of an aircraft wing.

7. The wing protection system as claimed in claim 1 comprising:

a compatible user device; and the processor assembly being communicably coupled to the compatible user device through the transceiver.

8. The wing protection system as claimed in claim 7, wherein the compatible user device is mounted to an aircraft tow vehicle.

9. The wing protection system as claimed in claim 1 comprising:

the processor assembly comprising a first processor and a second processor;

the plurality of sensors being electronically connected to the first processor; and the transceiver being electronically connected to the second processor.

10. The wing protection system as claimed in claim 1, wherein the peripheral alert system includes an audible alarm.

* * * * *